(12) United States Patent
Sugiura et al.

(10) Patent No.: US 8,547,163 B2
(45) Date of Patent: Oct. 1, 2013

(54) TEMPERATURE SENSOR DEVICE

(75) Inventors: Masakazu Sugiura, Chiba (JP); Atsushi Igarashi, Chiba (JP); Masahiro Mitani, Chiba (JP)

(73) Assignee: Seiko Instruments Inc., Chiba (JP)

( * ) Notice: Subject to any disclaimer, the term of this patent is extended or adjusted under 35 U.S.C. 154(b) by 51 days.

(21) Appl. No.: 13/345,064

(22) Filed: Jan. 6, 2012

(65) Prior Publication Data

US 2012/0182062 A1    Jul. 19, 2012

(30) Foreign Application Priority Data

Jan. 14, 2011    (JP) .................................. 2011-006101

(51) Int. Cl.
*H01L 35/00*    (2006.01)

(52) U.S. Cl.
USPC ........................................................ 327/512

(58) Field of Classification Search
USPC ................................. 327/512, 513
See application file for complete search history.

(56) References Cited

U.S. PATENT DOCUMENTS

| | | | |
|---|---|---|---|
| 6,468,825 B1 * | 10/2002 | Machida et al. | 438/48 |
| 6,982,916 B2 * | 1/2006 | Tsang | 365/213 |
| 7,540,657 B2 * | 6/2009 | Mikuni et al. | 374/178 |
| 7,997,794 B2 * | 8/2011 | Igarashi | 374/178 |
| 8,289,094 B2 * | 10/2012 | Wennekers et al. | 331/167 |

FOREIGN PATENT DOCUMENTS

JP    05-248962 A    9/1993

* cited by examiner

*Primary Examiner* — Jeffrey Zweizig
(74) *Attorney, Agent, or Firm* — Brinks Hofer Gilson & Lione

(57) ABSTRACT

Provided is a temperature sensor device operable at a lower voltage. The temperature sensor device detects temperature based on an output voltage of a forward voltage generator for generating a forward voltage of a PN junction. The forward voltage generator includes a level shift voltage generation circuit, and an output voltage of the temperature sensor device is given based on the forward voltage of the PN junction and a voltage of the level shift voltage generation circuit.

4 Claims, 7 Drawing Sheets

TEMPERATURE SENSOR DEVICE

RELATED APPLICATIONS

This application claims priority under 35 U.S.C. §119 to Japanese Patent Application No. 2011-006101 filed on Jan. 14, 2011, the entire content of which is hereby incorporated by reference.

BACKGROUND OF THE INVENTION

1. Field of the Invention

The present invention relates to a temperature sensor device for detecting temperature.

2. Description of the Related Art

Conventionally, a temperature sensor device for detecting temperature, which utilizes a forward voltage of the PN junction, is well known (see, for example, Japanese Patent Application Laid-open No. Hei 5-248962).

FIG. 7 is a circuit diagram illustrating a conventional temperature sensor device. The conventional temperature sensor device includes a constant current source circuit 701 and Darlington-connected bipolar transistors 702, 703, and 704 supplied with a constant current from the constant current source circuit 701.

An emitter of the bipolar transistor 704 is connected to an output terminal. An output voltage of the temperature sensor device is the sum of forward voltages of the PN junctions of the bipolar transistors. The forward voltage of the PN junction changes in accordance with temperature, and hence the output voltage is a voltage that changes in accordance with temperature.

In the temperature sensor device configured as described above, temperature detection accuracy of the temperature sensor device is enhanced as the sensitivity with which the output voltage changes in accordance with temperature becomes higher. Therefore, the temperature detection accuracy of the temperature sensor device can be enhanced by increasing the sum of the forward voltages of the PN junctions. In general, it is known that the temperature sensitivity of the forward voltage of the PN junction is approximately 2.5 mV/° C.

In the case of the temperature sensor device of FIG. 7, the number of effective stages of PN junctions is three, and hence the sum of the forward voltages is three times the forward voltage of one PN junction. Therefore, the sensitivity with which the output voltage changes in accordance with temperature is approximately 7.5 mV/° C., which is three times the temperature sensitivity of the forward voltage of one PN junction.

In the conventional temperature sensor device, however, if the number of effective stages of PN junctions is increased for enhancing the sensitivity with which the output voltage changes in accordance with temperature, the sum of the forward voltages of the PN junctions becomes larger. Therefore, the conventional temperature sensor device has a problem that an operating voltage cannot be suppressed to be lower. This problem results in inefficiency in the sense that a low voltage range of a power supply voltage supplied from a battery or the like cannot be used.

SUMMARY OF THE INVENTION

The present invention has been devised in order to solve the above-mentioned problem, and realizes a temperature sensor device operable at a lower voltage.

The present invention provides a temperature sensor device including a forward voltage generator for generating a forward voltage of a PN junction, for detecting temperature based on an output voltage of the forward voltage generator, in which the forward voltage generator includes a level shift voltage generation circuit, and an output voltage of the temperature sensor device is given based on the forward voltage of the PN junction and a voltage of the level shift voltage generation circuit.

According to the present invention, the temperature sensor device operable at a lower voltage can be provided.

DETAILED DESCRIPTION OF THE PREFERRED EMBODIMENT

Figure 1:
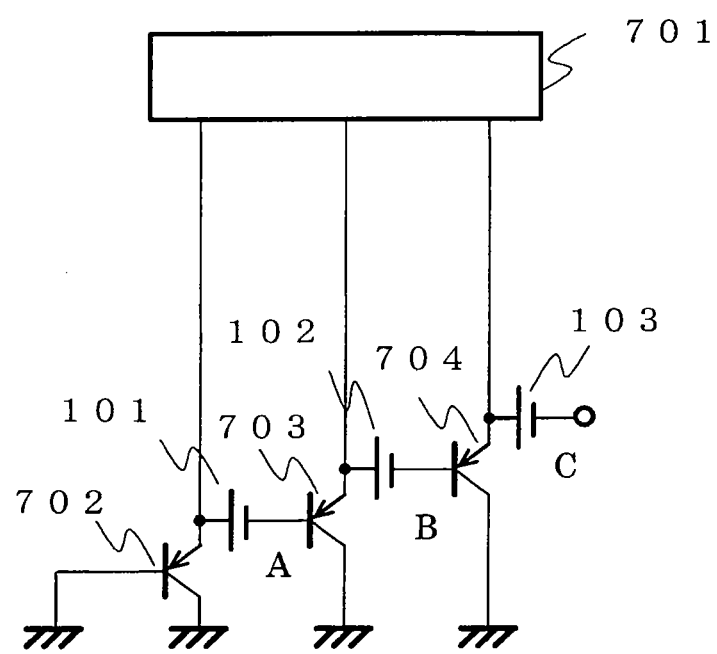
FIG. 1 is a circuit diagram illustrating a temperature sensor device according to an embodiment of the present invention.

FIG. 1 is a circuit diagram illustrating a temperature sensor device according to an embodiment of the present invention. The temperature sensor device of this embodiment includes a constant current source circuit 701, Darlington-connected bipolar transistors 702, 703, and 704 supplied with a constant current from the constant current source circuit 701, and voltage sources 101, 102, and 103.

The voltage source 101 is connected between an emitter of the bipolar transistor 702 and a base of the bipolar transistor 703. The voltage source 102 is connected between an emitter of the bipolar transistor 703 and a base of the bipolar transistor 704. The voltage source 103 is connected between an emitter of the bipolar transistor 704 and an output terminal. Here, voltages V1, V2, and V3 of the voltage sources 101, 102, and 103 do not have temperature characteristics.

Next, an operation of the temperature sensor device of this embodiment is described.

A forward voltage of the PN junction is represented by Vpn. In this case, a voltage V(A) at the point A, a voltage V(B) at the point B, and a voltage V(C) at the point C are calculated as follows, respectively.

$$V(A) = 1 \times Vpn - V1 \tag{1}$$

$$V(B) = 2 \times Vpn - (V1 + V2) \tag{2}$$

$$V(C) = 3 \times Vpn - (V1 + V2 + V3) \tag{3}$$

The voltage V(C) is a voltage at the output terminal, and accordingly an output voltage of the temperature sensor device is given as 3×Vpn−(V1+V2+V3). That is, the output voltage of the temperature sensor device of this embodiment is lower than the output voltage of the conventional temperature sensor device by the voltage (V1+V2+V3). It follows that the temperature sensor device of this embodiment is capable of suppressing an operating voltage to be low even when the number of effective stages of PN junctions is increased. The voltages V1, V2, and V3 do not have temperature characteristics, and hence the sensitivity with which the output voltage changes in accordance with temperature is comparable to that in the conventional temperature sensor device.

In other words, it can be said that the operating voltage can be suppressed to be lower, though the sensitivity with which the output voltage changes in accordance with temperature is comparable to that in the conventional temperature sensor device.

According to the temperature sensor device of this embodiment, by employing the configuration described above, it is possible to provide a temperature sensor device operable at a lower voltage.

Note that, in the temperature sensor device of this embodiment, the voltage source is provided to the emitter of each bipolar transistor, but not all the voltage sources need to be provided. For example, even with only the voltage source 101, the effect to achieve low voltage operation of the temperature sensor device can be expected.

Further, in the temperature sensor device of this embodiment described above, the number of effective stages of PN junctions is three. However, it is apparent that the same effect can be obtained irrespective of the number of effective stages of PN junctions.

Figure 2:
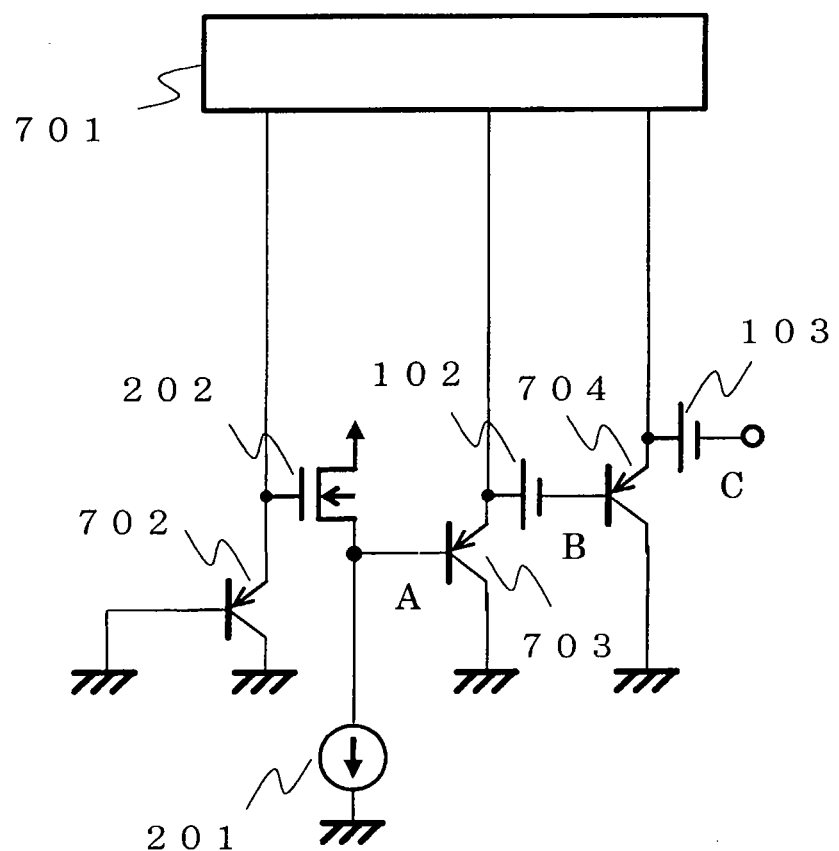
FIG. 2 is a circuit diagram illustrating a specific example of a voltage source included in the temperature sensor device according to the embodiment of the present invention.

FIG. 2 is a circuit diagram illustrating a specific example of the voltage source included in the temperature sensor device of this embodiment. For simplification, a specific example of only the voltage source 101 is illustrated.

The voltage source 101 includes a current source 201 and a MOS transistor 202.

The voltage V1 of the voltage source 101 is applied based on a gate-source voltage of the MOS transistor 202 biased by the current source 201.

Figure 3:
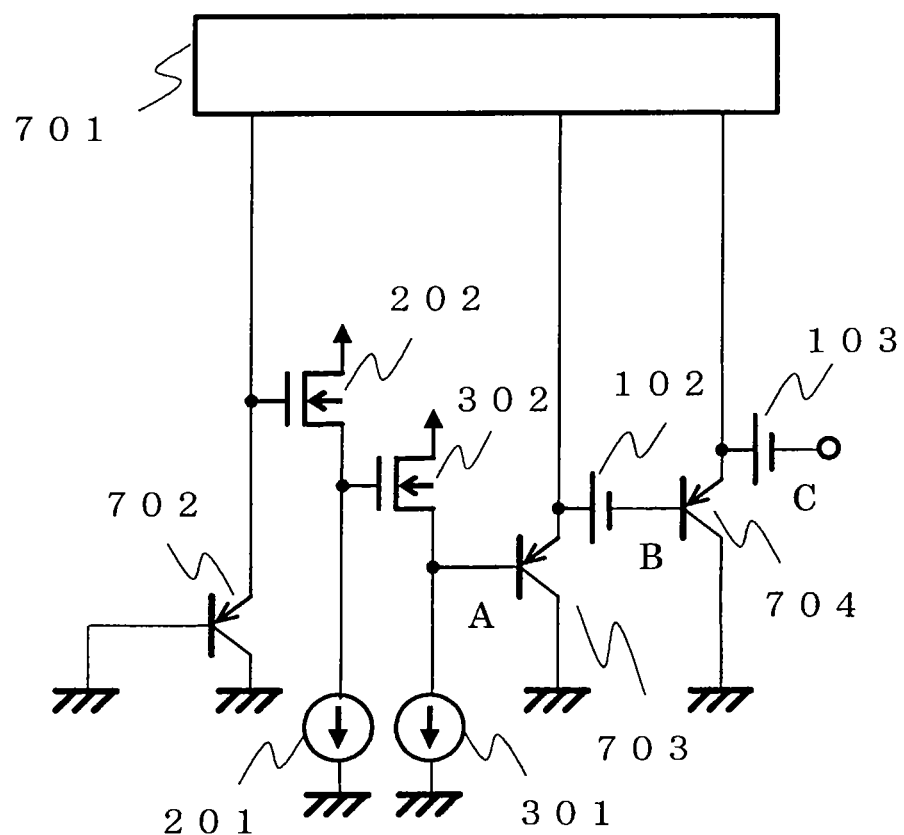
FIG. 3 is a circuit diagram illustrating another specific example of the voltage source included in the temperature sensor device according to the embodiment of the present invention.

As another example, the voltage source may be a circuit as illustrated in FIG. 3. The voltage source 101 includes current sources 201 and 301 and MOS transistors 202 and 302. That is, the voltage source may be realized by Darlington-connected MOS transistors.

Figure 4:
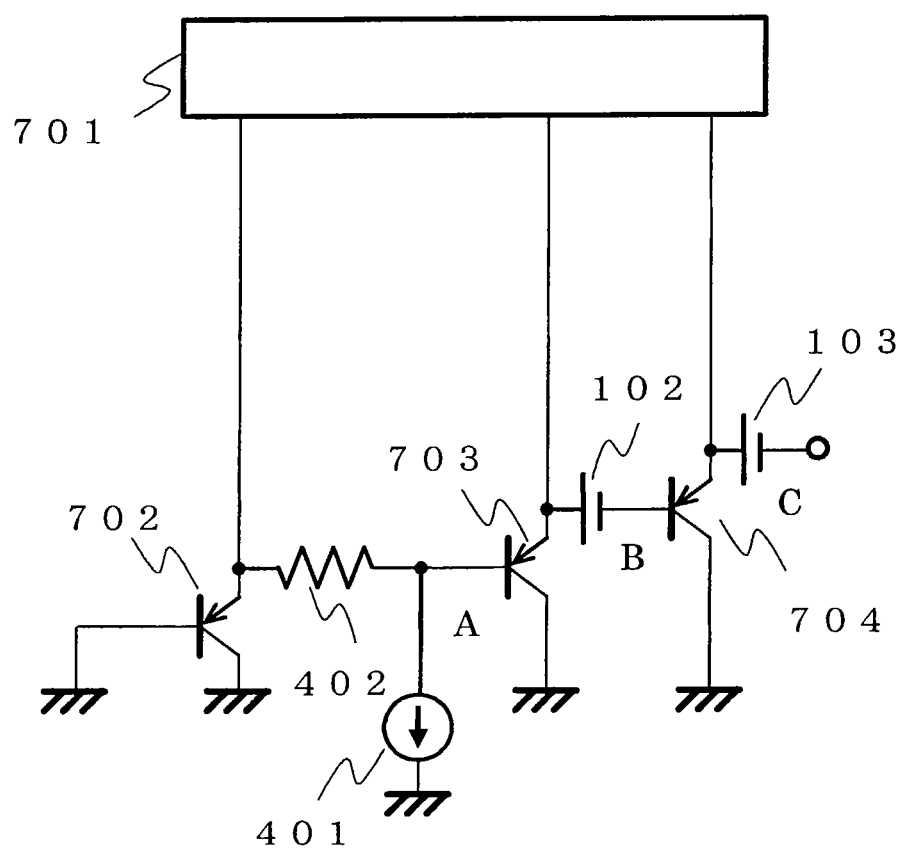
FIG. 4 is a circuit diagram illustrating still another specific example of the voltage source included in the temperature sensor device according to the embodiment of the present invention.

As still another example, the voltage source may be a circuit as illustrated in FIG. 4. The voltage source 101 includes a current source 401 and a resistor 402. The voltage V1 of the voltage source 101 is applied based on a resistance of the resistor 402 biased by the current source 401.

Figure 5:
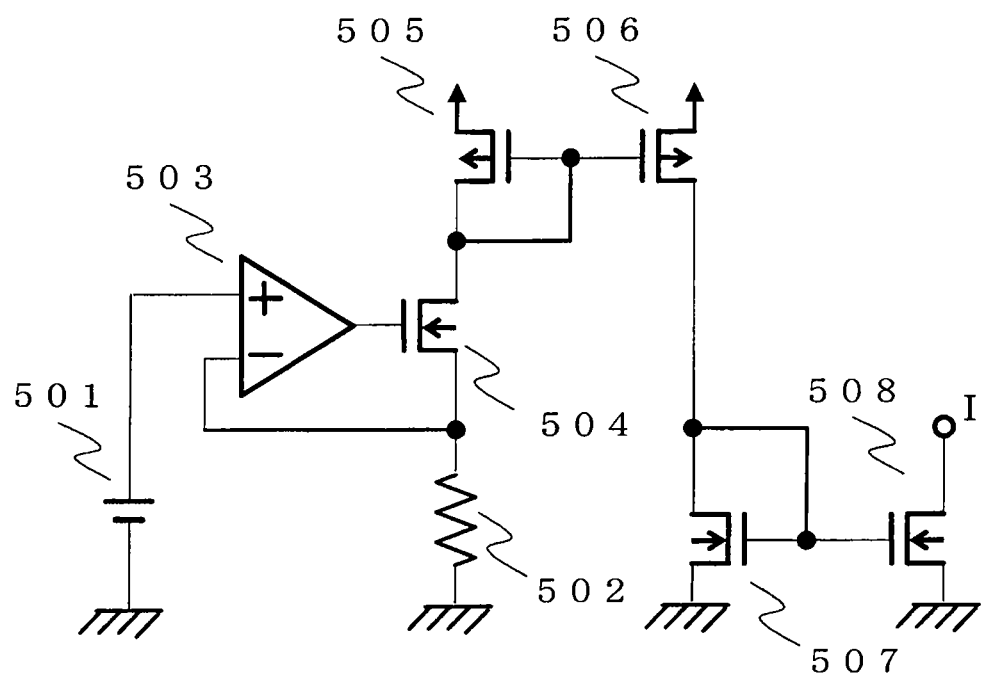
FIG. 5 is a circuit diagram illustrating an example of a current source of FIG. 4.

In this case, if there are fluctuations in resistance of the resistor 402, the influence of the fluctuations in resistance can be reduced by configuring the current source 401 by a circuit as illustrated in FIG. 5, for example. The current source 401 performs impedance conversion on a voltage supplied by a voltage source 501, and generates a current obtained through division by a resistance of a resistor 502. That is, the current source 401 uses the resistor 502 of the same type as the resistor 402 to output a current I for canceling the fluctuations in resistance of the resistor 402. Note that, the circuit of the current source 401 illustrated in FIG. 5 is an example, and the current source 401 is not limited to this circuit.

Note that, in the temperature sensor device of this embodiment described above, the voltage of the voltage source does not have temperature characteristics, but may have temperature characteristics. Particularly when the voltage source has controlled positive temperature characteristics, a higher-sensitive temperature sensor device can be provided.

For example, such a temperature sensor device may be configured by using, as the current source 401 of FIG. 4, the current source of FIG. 5 in which a resistor having negative temperature characteristics is used as the resistor 502, and using the resistor 402 having positive temperature characteristics.

Figure 6:
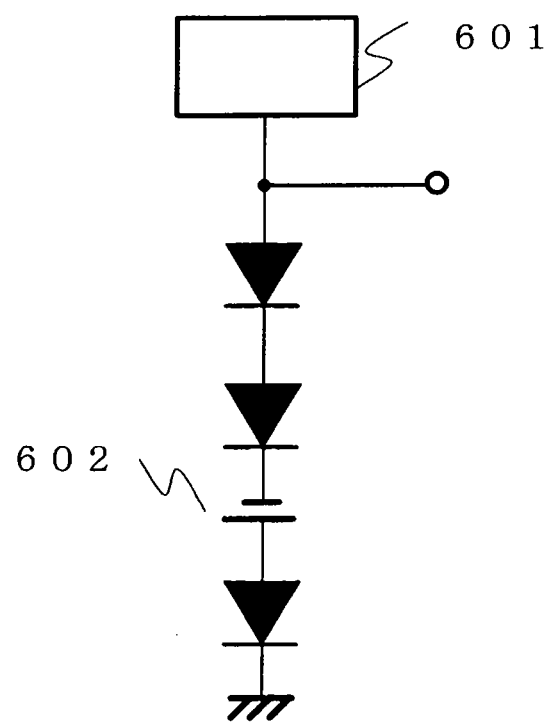
FIG. 6 is a circuit diagram illustrating another example of the temperature sensor device according to the embodiment of the present invention.
Figure 7:
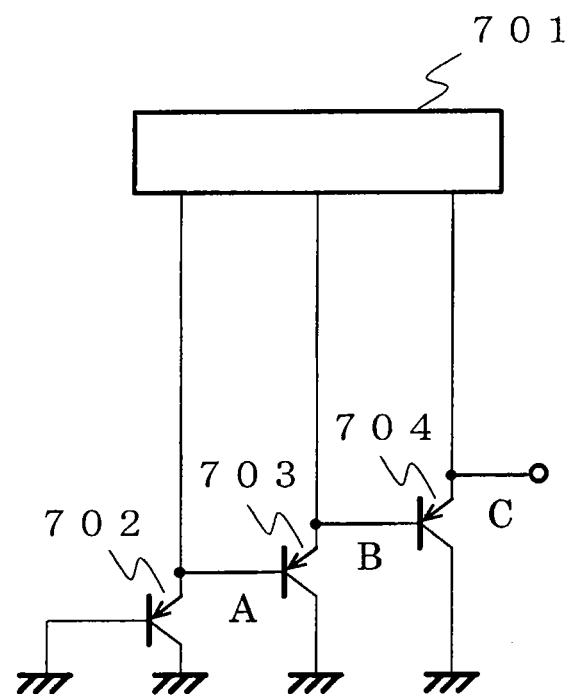
FIG. 7 is a circuit diagram illustrating a conventional temperature sensor device.

Further, the temperature sensor device of this embodiment described above is a temperature sensor using a forward voltage of the PN junction of a bipolar transistor, but a diode element may be used instead. As an example, a temperature sensor device includes a constant current source 601, three-stage diodes, and a voltage source 602 as illustrated in FIG. 6. An output voltage is determined by subtracting a voltage of the voltage source 602 from a voltage generated in the three-stage diodes. The operating voltage can be suppressed to be lower, though the sensitivity is substantially comparable to that in the case where no voltage source 602 is provided.

What is claimed is:

1. A temperature sensor device comprising:
    a plurality of bipolar transistors;
    at least one level shift voltage generation circuit coupled in series between an emitter of a first bipolar transistor and a base of a second bipolar transistor,
    wherein an output voltage of the temperature sensor device is given based on the forward voltage of PN junctions of the plurality of bipolar transistors and a voltage of the level shift voltage generation circuit.

2. A temperature sensor device according to claim 1, wherein the voltage of the level shift voltage generation circuit is applied based on a gate-source voltage of a MOS transistor.

3. A temperature sensor device according to claim 1, wherein the voltage of the level shift voltage generation circuit is applied based on a voltage generated across a resistor.

4. A temperature sensor device according to claim 1, wherein the voltage of the level shift voltage generation circuit has positive temperature characteristics.

* * * * *